United States Patent
Seksenov et al.

(10) Patent No.: US 10,496,381 B2
(45) Date of Patent: Dec. 3, 2019

(54) PROGRESSIVE WEB APP AUTO-INGESTION

(71) Applicant: Microsoft Technology Licensing, LLC, Redmond, WA (US)

(72) Inventors: Kiril Nikolov Seksenov, Seattle, WA (US); Kirupa Chinnathambi, Redmond, WA (US); Kevin Jason Hill, Redmond, WA (US); Jeffrey Clark Burtoft, Mico, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/823,520

(22) Filed: Nov. 27, 2017

(65) Prior Publication Data
US 2019/0163453 A1    May 30, 2019

(51) Int. Cl.
| | |
|---|---|
| *G06F 8/40* | (2018.01) |
| *H04L 29/08* | (2006.01) |
| *H04L 12/24* | (2006.01) |
| *G06F 16/95* | (2019.01) |

(52) U.S. Cl.
CPC ............... *G06F 8/40* (2013.01); *G06F 16/95* (2019.01); *H04L 41/0803* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 8,788,935 | B1* | 7/2014 | Hirsch | G06F 17/2247 715/234 |
| 9,075,833 | B2* | 7/2015 | Gao | G06F 16/211 |
| 9,448,776 | B1* | 9/2016 | Sankaran | G06F 16/972 |
| 2014/0172911 | A1* | 6/2014 | Cohen | H04L 67/42 709/203 |
| 2014/0214898 | A1* | 7/2014 | Shapira | G06F 17/30864 707/771 |
| 2014/0250106 | A1* | 9/2014 | Shapira | G06F 17/30864 707/722 |
| 2014/0279997 | A1* | 9/2014 | Chiussi | G06F 17/30864 707/706 |

(Continued)

OTHER PUBLICATIONS

Liping Xu, S. Eli and Haiyin Xu, "A method of focused crawling for software components," Proceedings 2011 International Conference on Transportation, Mechanical, and Electrical Engineering (TMEE), Changchun, 2011, pp. 1560-1563. (Year: 2011).*

*Primary Examiner* — Wei Y Zhen
*Assistant Examiner* — Binh Luu
(74) *Attorney, Agent, or Firm* — Fountainhead Law Group.P.C (57) ABSTRACT

Techniques for automatically ingesting progressive web apps (PWAs) into an application store of an operating system (OS) are provided. According to one set of embodiments, a computer system can receive a list of PWAs identified via crawling one or more websites. For at least one PWA in the list, the computer system can convert the PWA into a native application that is native to the OS of the application store. The computer system can then make the native application available through the application store for discovery by a user and for installation on a client device of the user.

21 Claims, 4 Drawing Sheets

(56) References Cited

U.S. PATENT DOCUMENTS

| | | | |
|---|---|---|---|
| 2014/0281886 A1* | 9/2014 | Hirsch | G06F 17/2247 715/234 |
| 2014/0282371 A1* | 9/2014 | Hirsch | G06F 8/36 717/106 |
| 2015/0089339 A1* | 3/2015 | Hirsch | G06F 17/2247 715/205 |

* cited by examiner

PROGRESSIVE WEB APP AUTO-INGESTION

BACKGROUND

A Progressive Web App, or PWA, is an emerging type of software application that is implemented as one or more web pages (i.e., a website) rendered in a standard web browser, but leverages recent advances in web development technologies to present, via the web browser, an application user interface (UI) that is very similar in look, feel, and behavior to a native desktop or mobile application. In order for a website to function as a PWA, the website must generally include two components: a web app manifest and a service worker. The web app manifest is a JavaScript Object Notation (JSON) text file that provides information about the PWA such as application name, author, icon, description, and so on. The service worker is a JavaScript file/code segment that enables certain PWA features such as push notifications, resource caching, and offline access to application content.

Because PWAs are essentially websites, users are generally limited to finding and running PWAs via their web browsers. Accordingly, it would be useful to have techniques that provide users greater flexibility with respect to PWA discovery and access.

SUMMARY

Techniques for automatically ingesting progressive web apps (PWAs) into an application store of an operating system (OS) are provided. According to one set of embodiments, a computer system can receive a list of PWAs identified via crawling one or more websites. For at least one PWA in the list, the computer system can convert the PWA into a native application that is native to the OS of the application store. The computer system can then make the native application available through the application store for discovery by a user and for installation on a client device of the user.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure is directed to techniques that enable the automatic ingestion of PWAs into an application store of an operating system (OS) (referred to herein as "PWA auto-ingestion"). These techniques generally involve (1) crawling websites to identify PWAs that have been created/updated by application developers, (2) converting the identified PWAs into an application format that is native to the OS, and (3) making the converted native applications available through the OS's application store.

With PWA auto-ingestion, users of the OS are not solely limited to discovering and running PWAs via their web browsers; rather, the users can also search/browse for PWAs via the application store and can install native application versions of the PWAs directly from the store. Further, since steps (1)-(3) are entirely automated, this capability is achieved without any intervention or effort (beyond normal PWA creation) on the part of the PWA application developers.

The foregoing and other aspects of the present disclosure are described in further detail in the sections that follow.

2. System Environment and High-Level Workflow

Figure 1:
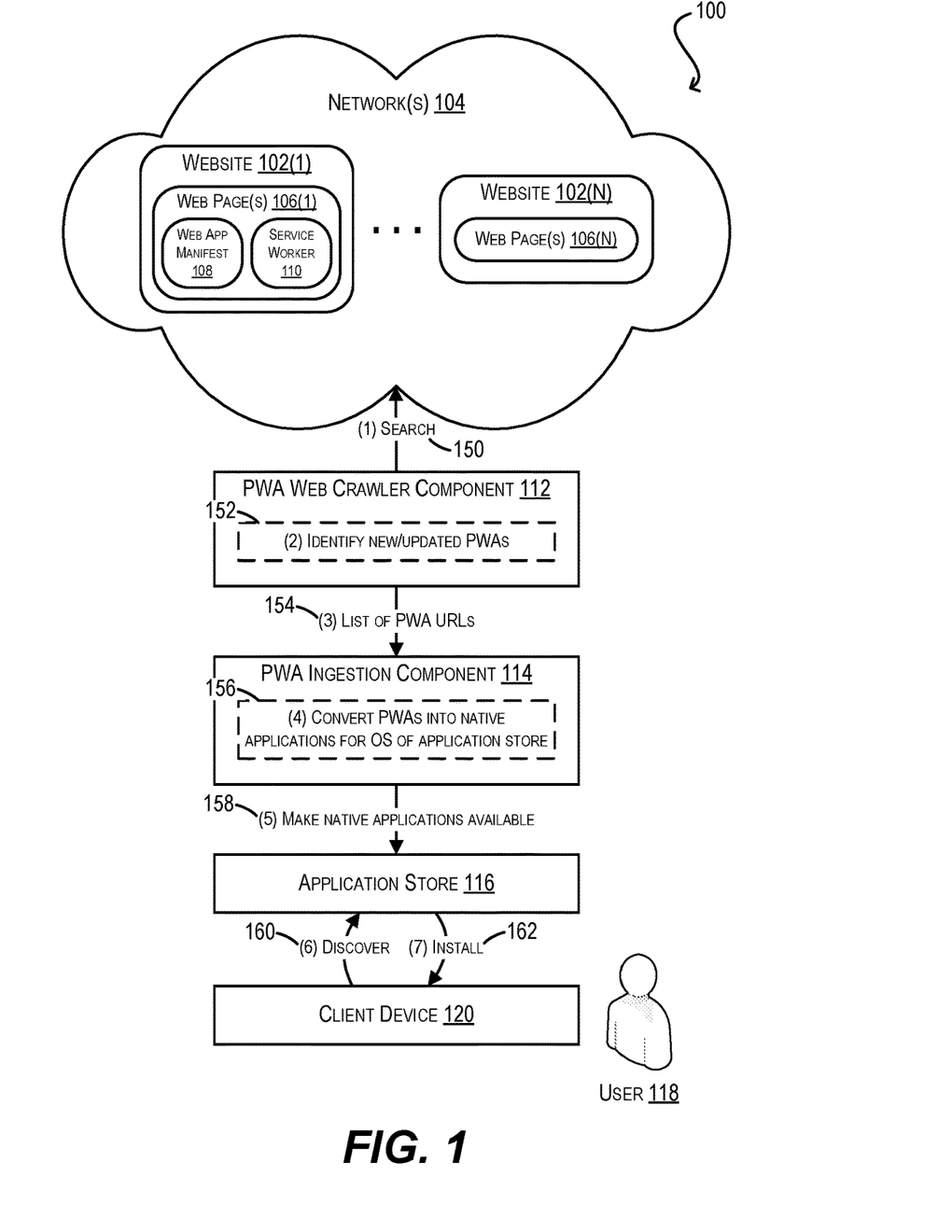
FIG. 1 is a simplified block diagram of a system environment and high-level workflow for implementing PWA auto-ingestion according to certain embodiments.

FIG. 1 is a simplified block diagram of a system environment 100 and a high-level workflow within environment 100 for implementing PWA auto-ingestion according to certain embodiments. As shown, system environment 100 includes a number of websites 102(1)-(N) that are accessible via one or more networks 104. Each website 102, in turn, includes one or more web pages 106 comprising, e.g., Hypertext Markup Language (HTML) markup, cascading style sheets (CSS), JavaScript, data content, and/or other elements. In one set of embodiments, websites 102(1)-(N) can represent all of the public websites that collectively constitute the World Wide Web. In other embodiments, websites 102(1)-(N) can represent a subset of these public websites, one or more private websites (i.e., websites that are only accessible via a private network such as an intranet), or a combination of the two.

In FIG. 1, a portion of websites 102(1)-(N) (such as, e.g., website 102(1)) are assumed to be implemented as PWAs. Thus, these particular websites include, as part of their respective web page content 106, a web app manifest 108 and a service worker 110. As mentioned previously, web app manifest 108 is a JSON text file (defined under a World Wide Web Consortium specification) that comprises PWA metadata such as application name, author, icon, description, etc. This manifest is typically referenced in an HTML link tag that is included in one or more of web pages 106. Further, service worker 110 is a JavaScript file/code segment that enables certain client-side PWA features such as push notifications, resource caching, offline application access, and more. This service worker is typically invoked/registered within the website's main JavaScript code block.

As noted in the Background section, since PWAs are essentially websites, users are generally limited to finding and accessing PWAs through their web browsers. Given the ubiquity of web browsers across computing platforms, this is not necessarily a problem or disadvantage of the technology; however, it would be useful to give users additional options for PWA discovery and access, beyond the confines of a web browser.

To address this, system environment 100 of FIG. 1 further includes a novel PWA web crawler component 112 and a novel PWA ingestion component 114 (which is depicted as interfacing with an application store 116 for a particular OS). As used herein, the term "application store" refers to a digital storefront through which users can find, purchase, and install software applications that are native to the OS of the application store (i.e., applications that have been specifically developed and/or compiled for use on that OS). Examples of well-known application stores include the Windows Store (for Microsoft Windows), the App Store (for Apple's iOS), and the Google Play Store (for Google's Android).

Taken together, PWA web crawler component 112 and PWA ingestion component 114 can automatically intake, or ingest, PWAs like website 102(1) into application store 116 in the form of native applications, thereby making the applications available for discovery and installation through store 116 by end-users (e.g., user 118 of client computing device 120). For example, as shown at reference numerals 150 and 152 (steps (1) and (2)) of FIG. 1, PWA web crawler component 112 can periodically crawl (i.e., search) websites 102(1)-(N) on network(s) 104 and identify new PWAs that component 112 has not encountered before (or existing PWAs that have been updated since component 112's last search). PWA web crawler component 112 can perform this search by looking for websites that meet the typical criteria for a PWA (e.g., have a web app manifest and service worker defined within its web page content). Upon identifying these new/updated PWAs, PWA web crawler component 112 can transmit a list of uniform resource locators (URLs) for the identified PWAs to PWA ingestion component 114 (reference numeral 154; step (3)).

At reference numeral 156 (step (4)), PWA ingestion component 114 can process the list of PWA URLs received from PWA web crawler component 112 and convert one or more of the PWAs into corresponding native applications that are native to the OS of application store 116. As part of this step, PWA ingestion component 114 may calculate a quality ranking or score for each PWA in the list and convert only those PWAs that meet a predefined quality threshold (described in further detail below).

Then, at reference numeral 158 (step (5)), PWA ingestion component 114 can make the native application versions of the PWAs available (e.g., searchable, browse-able, and installable) through application store 116. This, in turn, can allow user 118 (and other similar users) to discover the native application versions of those PWAs through store 116 (reference numeral 160; step (6)) and install/run the native applications on his/her client device 120 (reference numeral 162; step (7)).

With the architecture and high-level workflow shown in FIG. 1, a number of benefits can be realized. First, since PWA ingestion component 114 converts each PWA identified by PWA web crawler component 112 (subject to quality constraints) into a native application for the OS corresponding to application store 116 and makes this native application available on store 116, users like user 118 are no longer limited to finding and running such PWAs solely through a web browser. User 118 can continue to do so if he/she wishes, but the ingestion workflow of FIG. 1 provides another, perhaps more convenient avenue for PWA discovery and access.

Second, in some cases the conversion performed at reference numeral 156/step (4) can result in the native applications having more or superior capabilities than the original PWAs. Some of these capabilities may be a natural consequence of being converted into the native application format (e.g., ability to pin the application on the OS's start menu, taskbar, or equivalent, ability to run an instance of the application without having a web browser instance running, etc.). Other capabilities may arise out of explicit transformations during the conversion process to adapt certain PWA features into more flexible/functional/suitable variants in the native application (e.g., replacement of web push notifications with native OS notifications, replacement of limited server-side storage for application data with unlimited local storage, etc.).

Third, because the ingestion workflow of FIG. 1 is performed automatically by components 112 and 114, there is no need for PWA developers to expend any time or effort to facilitate the process; in fact, they do not even need to be aware that their PWAs are being ingested. Thus, this workflow advantageously increases the reach and distribution of PWAs beyond the web and onto OS store platforms in a manner that is completely transparent and painless to the PWA developers.

The remaining sections of this disclosure provide additional details regarding the implementation of PWA web crawler component 112 and PWA ingestion component 114. It should be appreciated that the depiction of these components in FIG. 1 is illustrative and not intended to limit the embodiments of the present disclosure. For example, components 112 and 114 are shown as logical entities and may be run on the same physical computer system/server, different physical computer system/servers, or across a cluster of physical computer systems/servers. Further, components 112 and 114 may include subcomponents and/or implement sub-functions that are not specifically depicted/described. One of ordinary skill in the art will recognize other variations, modifications, and alternatives.

3. Identifying PWAs

Figure 2:
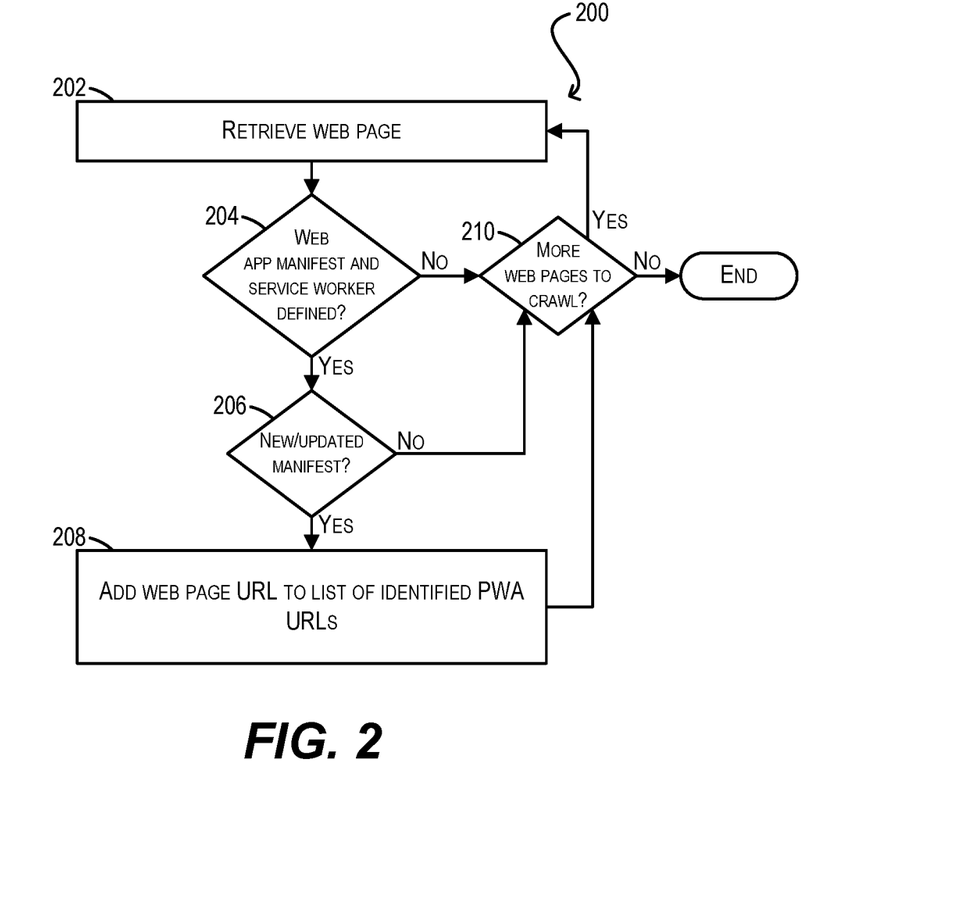
FIG. 2 depicts a flowchart for identifying PWAs according to certain embodiments.

FIG. 2 depicts a flowchart 200 that can be executed by PWA web crawler component 112 for identifying new/updated PWAs (per steps (1) and (2) of FIG. 1) that are candidates for ingestion into application store 116 according to certain embodiments. As mentioned previously, PWA web crawler component 112 can repeat this process on a periodic basis, such as once a day or once every X days, in order to identify new/updated PWAs that have appeared during that time interval. In some embodiments, the logic of flowchart 200 can be incorporated into an existing web crawler that is used to index websites for a web search engine, such as Google web search or Bing web search.

Starting with block 202, PWA web crawler component 112 can retrieve a web page that is part of its list of web pages "to visit" (i.e., its "crawl frontier") as defined by the component's crawling policies. The specific nature of these crawling policies will vary depending on the web crawler's implementation.

At block 204, PWA web crawler component 112 can determine whether the retrieved web page has both a web app manifest and a service worker defined (indicating that the web page corresponds to a PWA). With respect to the former, this can involve looking for an HTML link tag in the web page that references a web app manifest. With respect to the latter, this can involve looking for JavaScript code in the web page that invokes/registers a service worker.

If PWA web crawler component 112 determines at block 204 that either the web app manifest or service worker is missing, component 112 can jump to block 210 and check whether there are any more web pages in the crawl frontier; if so, component 112 can return to block 202 in order to retrieve and process the next web page and if not, flowchart 200 can end.

On the other hand, if PWA web crawler component 112 determines at block 204 that both the web app manifest and service worker are present, component 112 can move on to determining whether the web app manifest is a new/unique manifest (i.e., a web app manifest that it has not encountered before), or an existing web app manifest that has been updated since the last version (block 206). If neither of these conditions are true, PWA web crawler component 112 can jump to block 210. Otherwise, PWA web crawler component 112 can conclude that the current web page corresponds to a new or updated PWA and add the web page's URL to a list of identified PWAs (block 208).

Finally, PWA web crawler component 112 can proceed to block 210 in order to check whether there are any further web pages in the crawl frontier as mentioned above and can either return to block 202 or terminate the flowchart.

4. Ingesting PWAs

Figure 3:
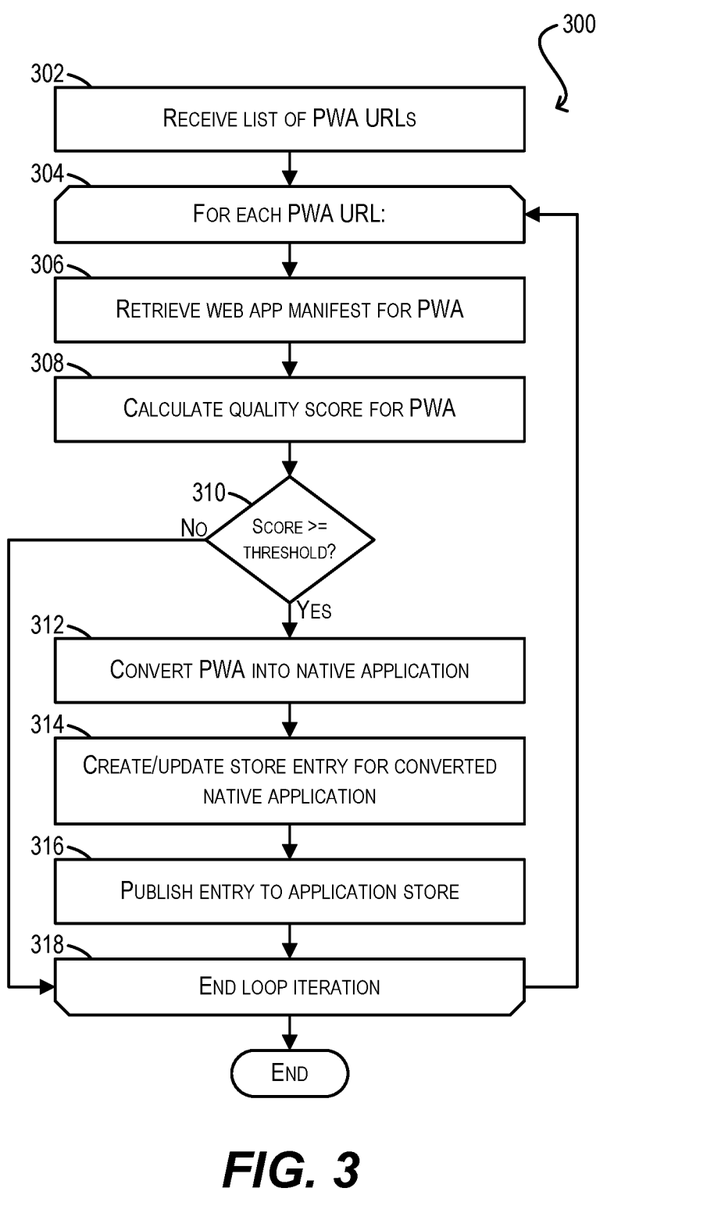
FIG. 3 depicts a flowchart for ingesting PWAs according to certain embodiments.

FIG. 3 depicts a flowchart 300 that can be executed by PWA ingestion component 114 for ingesting PWAs (per steps (4) and (5) of FIG. 1) that have been identified by web crawler component 112 via flowchart 200 into application store 116 according to certain embodiments. In some embodiments, PWA ingestion component 114 may execute flowchart 300 every time flowchart 200 is run. In other embodiments, PWA ingestion component 114 may execute flowchart 300 on a less frequent basis and thus operate on a list of PWA URLs that have been aggregated from multiple runs of flowchart 200.

Starting with block 302, PWA ingestion component 114 can receive the list of new/updated PWA URLs that have been generated by PWA web crawler component 112. In response, PWA ingestion component 114 can enter a loop for each URL in the list (block 304).

Within the loop, PWA ingestion component 114 can retrieve the web app manifest for the PWA (which should be linked to in the web page content of the URL) (block 306). PWA ingestion component 114 can then calculate a quality score for the PWA which indicates the likelihood that users will want to discover and install this PWA through application store 116 (block 308). PWA ingestion component 114 can take into account a number of different criteria for this calculation, such as whether the web app manifest is missing any information (e.g., application icon, description, etc.), existence of a valid service worker, popularity of the URL/web domain in web search rankings, HTTP/2 support, interest from users searching for the PWA (or similar applications) in application store 116, and so on. In some cases, PWA ingestion component 114 may incorporate scores or metrics for the URL that are derived from third-party web analytic tools (e.g., Google's Lighthouse) into the calculation.

At block 310, PWA ingestion component 114 can check whether the calculated quality score meets or exceeds a predefined threshold. If not, PWA ingestion component 114 can skip to the end of the current loop iteration (block 318). This ensures that "low quality" PWAs (i.e., PWAs that users are likely not interested in or would likely provide a poor user experience) are not ingested into application store 116.

On the other hand, if PWA ingestion component 114 determines at block 310 that the PWA's quality score meets or exceeds the threshold, component 114 can convert the PWA into a native application for the OS of application store 116 (block 312). As indicated previously, a "native application" for a given OS is an application that has been specifically developed and/or compiled to run on that OS. The details of this conversion process will vary depending on the target OS, but it can generally involve (1) translating the JSON-based web app manifest (and in some cases, the service worker code) into an appropriate structured data or binary format understood by the target OS, and (2) downloading data files (e.g., icon images, etc.) used by the PWA and including the data files into the converted native application package.

By way of example, Listing 1 below is an exemplary JSON-based web app manifest and Listing 2 below is the result of translating Listing 1 into an Extensible Markup Language (XML)-based "APPX" manifest that is natively used/understood by Microsoft Windows.

---
Listing 1
---

```
{
    "name": "The Air Horner",
    "short_name": "Air Horner",
    "icons": [{
            "src": "images/touch/Airhorner_128.png",
            "type": "image/png",
            "sizes": "128x128"
        }, {
            "src": "images/touch/Airhorner_152.png",
            "type": "image/png",
            "sizes": "152x152"
        }, {
            "src": "images/touch/Airhorner_144.png",
            "type": "image/png",
            "sizes": "144x144"
        }, {
            "src": "images/touch/Airhorner_192.png",
            "type": "image/png",
            "sizes": "192x192"
        },
        {
            "src": "images/touch/Airhorner_256.png",
            "type": "image/png",
            "sizes": "256x256"
        },
        {
            "src": "images/touch/Airhorner_512.png",
            "type": "image/png",
            "sizes": "512x512"
        }],
    "start_url": "/?homescreen=1",
    "scope": "/",
    "display": "standalone",
    "background_color": "#2196F3",
    "theme_color": "#2196F3"
}
```

---
Listing 2
---

```
<?xml version="1.0" encoding="utf-8"?>
<Package
xmlns="http://schemas.microsoft.com/appx/manifest/foundation/windows10"
xmlns:mp="http://schemas.microsoft.com/appx/2014/phone/manifest"
xmlns:uap="http://schemas.microsoft.com/appx/manifest/uap/windows10"
xmlns:build="http://schemas.microsoft.com/developer/appx/2015/build"
IgnorableNamespaces="uap mp build">
    <Identity Name="INSERT-YOUR-PACKAGE-IDENTITY-NAME-HERE"
Publisher="CN=INSERT-YOUR-PACKAGE-IDENTITY-PUBLISHER-HERE"
Version="1.0.0.0" ProcessorArchitecture="neutral"/>
        <mp:PhoneIdentity PhoneProductId="6846a6c7-a1f3-78e8-1c14-
b079583462dd" PhonePublisherId="00000000-0000-0000-0000-000000000000"/>
```

-continued

Listing 2

```
<build:Metadata>
        <build:Item Name="GenerationTool" Version="pwabuilder-api"/>
        <build:Item Name="GenerationToolVersion" Version="2.0.1-rc.0"/>
    <build:Item Name="PlatformId" Value="windows10"/>
    <build:Item Name="PlatformPackage" Value="pwabuilder-windows10"/>
    <build:Item Name="PlatformVersion" Version="2.0.1-rc.1"/>
        <build:Item Name="GeneratedFrom" Value="Website Wizard"/>
        <build:Item Name="GenerationDate" Value="2017-10-31 19:23:31 Z"/>
        <build:Item Name="GeneratedURL" Value="https://airhorner.com/manifest.json"/>
    </build:Metadata>
    <Properties>
        <DisplayName>Air Horner</DisplayName>
    <PublisherDisplayName>INSERT-YOUR-PACKAGE-PROPERTIES-PUBLISHERDISPLAYNAME-HERE</PublisherDisplayName>
    <Logo>images\StoreLogo.png</Logo>
    </Properties>
    <Dependencies>
        <TargetDeviceFamily Name="Windows.Universal" MinVersion="10.0.10240.0" MaxVersionTested="10.0.10240.0"/>
    </Dependencies>
    <Resources>
    <Resource Language="en-us"/>
        </Resources>
    <Applications>
        <Application Id="AirHorner" StartPage="https://airhorner.com/?homescreen=1">
            <uap:VisualElements DisplayName="Air Horner" Square150x150Logo="images\Square150x150Logo.png" Square44x44Logo="images\Square44x44Logo.png" Description="The Air Horner" BackgroundColor="#2196F3">
                <uap:InitialRotationPreference>
                    <uap:Rotation Preference="portrait"/>
                </uap:InitialRotationPreference>
            </uap:VisualElements>
            <uap:ApplicationContentUriRules>
                <uap:Rule Type="include" WindowsRuntimeAccess="all" Match="https://airhorner.com/"/>
            </uap:ApplicationContentUriRules>
        </Application>
    </Applications>
    <Capabilities>
        <Capability Name="internetClient"/>
    </Capabilities>
</Package>
```

Upon completing the conversion process, PWA ingestion component 114 can create a store entry for the converted native application (or update an existing store entry if the PWA was simply updated) based on the PWA metadata included in the web app manifest (block 314). For instance, the store entry can include the application name, author, version, icon, splash screen, description, and/or other information. The store entry can also include a link for downloading/installing the converted native application.

Finally, at block 316, PWA ingestion component 114 can publish the store entry to application store 116, thereby making the entry available (e.g., searchable and browseable) in store 116 by users, and the current loop iteration can end (block 318). PWA ingestion component 114 can subsequently repeat loop 304 until all of the PWA URLs in the received list are processed and then terminate the flowchart.

5. Client-Side Modifications

As mentioned previously, in some embodiments the conversion of a PWA into a native application can increase or improve the capabilities of the native application relative to the original PWA. Examples of such increased or improved capabilities include the ability to pin the application on the OS's start menu/taskbar/equivalent, ability to make use of OS-native notifications, ability to provide unlimited local storage for application data, and so on.

Depending on the target OS, the provision of these increased or improved capabilities may require client-side modifications (i.e., updates to the OS running on end-user devices). In the case where the target OS is Microsoft Windows and the converted native application format is Universal Windows Platform (UWP) (previously known as UWA), such client-side modifications can include changes to the Windows Web App Host (WWAHost) (which is a container for web-based UWP applications) to support the following:

Service worker declaration
Wildcard/dynamic navigation
Unlimited local storage
App identity on the system (allows for application installation, pinning, etc.)

Other types of client-side modifications may be needed or desirable for other target OSs and/or native application formats.

6. Example Computing System/Device

Figure 4:
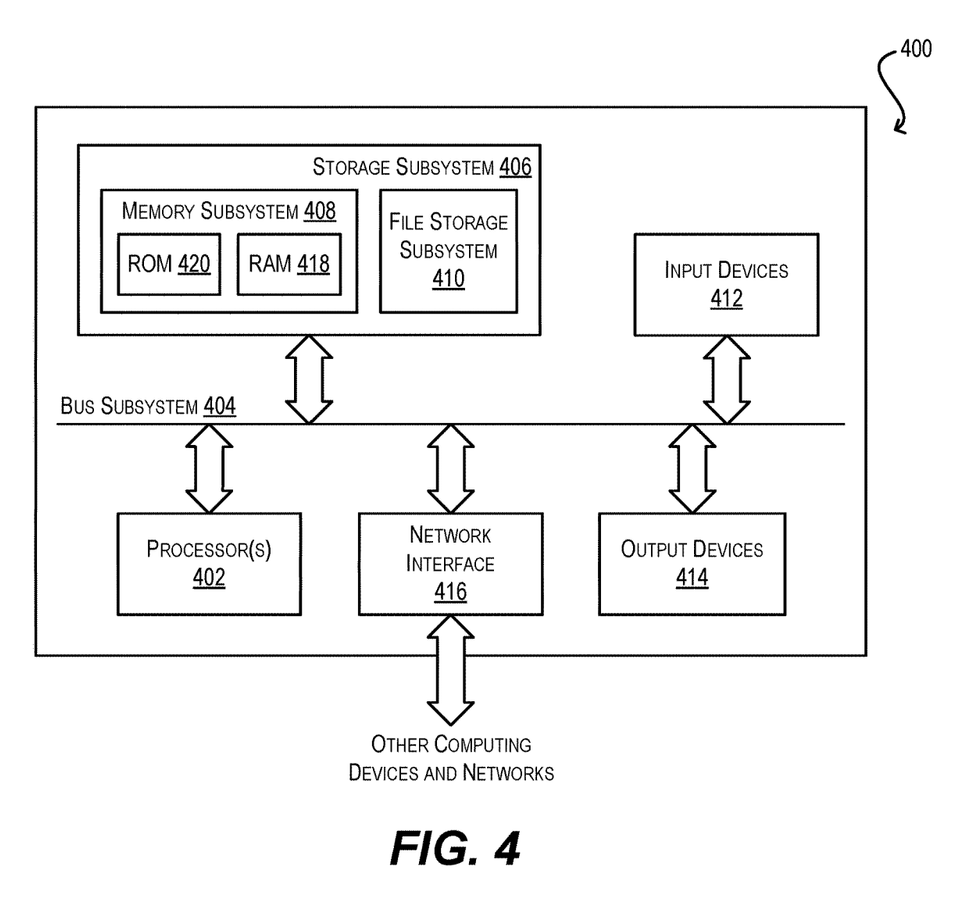
FIG. 4 is a simplified block diagram of a computing system/device according to certain embodiments.

FIG. 4 is a simplified block diagram of an example computing system/device 400 according to certain embodiments. Computing system/device 400 (and/or equivalent systems/devices) may be used to run any of the software components described in the foregoing disclosure, including PWA web crawler component 112 and PWA ingestion component 114 of FIG. 1. As shown in FIG. 4, computing system/device 400 includes one or more processors 402 that communicate with a number of peripheral devices via a bus subsystem 404. These peripheral devices include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computing system/device 400 communicate with each other as intended. Although bus subsystem 404 is shown schematically as a single bus, alternative embodiments of the bus subsystem can utilize multiple busses.

Network interface subsystem 416 can serve as an interface for communicating data between computing system/device 400 and other computer systems or networks. Embodiments of network interface subsystem 416 can include, e.g., an Ethernet module, a Wi-Fi and/or cellular connectivity module, and/or the like.

User interface input devices 412 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computing system/device 400.

User interface output devices 414 can include a display subsystem and/or non-visual output devices such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computing system/device 400.

Storage subsystem 406 includes a memory subsystem 408 and a file/disk storage subsystem 410. Subsystems 408 and 410 represent non-transitory computer-readable storage media that can store program code and/or data that provide the functionality of embodiments of the present disclosure.

Memory subsystem 408 includes a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computing system/device 400 is illustrative and other configurations having more or fewer components than computing system/device 400 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a non-transitory computer readable storage medium having stored thereon program code that, when executed by the processor, causes the processor to:
   receive, from a web crawler, a list of progressive web apps (PWAs) identified via crawling one or more websites, the web crawler being configured to, for each of the one or more websites:
   retrieve a web page of the website;
   determine whether the web page is a PWA by checking whether the web page defines a web app manifest and a service worker, wherein the service worker is a JavaScript code segment that enables one or more client-side PWA features including push notifications, and wherein checking whether the web page defines the service worker comprises checking for an invocation of the service worker within a main JavaScript code block of the web page; and
   if the web page is a PWA, add a uniform resource locator (URL) of the web page to the list of PWAs; and
   for at least one PWA in the list:
   convert the at least one PWA into a native application that is native to an operating system (OS) of an application store; and
   make the native application available through the application store for discovery by a user and for installation on a client device of the user.

2. The computer system of claim 1 wherein the web crawler is further configured to determine, prior to adding the URL of the web page to the list of PWAs, whether the web page is:
   a new PWA that the web crawler has not encountered before; or
   an updated PWA that has been modified since a last search performed by the web crawler.

3. The computer system of claim 2 wherein the web crawler determines whether the web page is a new PWA or an updated PWA by determining whether the web app manifest defined by the web page is a new web app manifest that the web crawler has not encountered before.

4. The computer system of claim 1 wherein the program code further causes the processor to calculate a quality score for each PWA in the list.

5. The computer system of claim 4 wherein the quality score is calculated based on whether a web app manifest for said each PWA is missing any information.

6. The computer system of claim 4 wherein the quality score is calculated based on whether said each PWA has a valid service worker defined.

7. The computer system of claim 4 wherein the quality score is calculated based on a degree of popularity of a URL or web domain of said each PWA in web search rankings.

8. The computer system of claim 4 wherein the quality score is calculated based on how often said each PWA is searched for in the application store.

9. The computer system of claim 4 wherein said each PWA is not converted into the native application if the quality score falls below a predefined threshold.

10. The computer system of claim 1 wherein the program code that causes the processor to convert the at least one PWA into the native application comprises program code that causes the processor to:
translate a web app manifest of the at least one PWA into a structured data or binary format that is understood by the OS.

11. The computer system of claim 10 wherein the program code that causes the processor to convert the at least one PWA into the native application further comprises program code that causes the processor to:
download one or more data files for the at least one PWA defined in the web app manifest; and
include the one or more data files in the native application.

12. The computer system of claim 11 wherein the one or more data files include an application icon for the at least one PWA.

13. The computer system of claim 1 wherein the native application supports one or more capabilities that are not supported by the at least one PWA.

14. The computer system of claim 13 wherein the one or more capabilities includes an ability to use local storage on the client device of the user for storing application data.

15. The computer system of claim 13 wherein the one or more capabilities include an ability to generate user notifications that are native to the OS.

16. The computer system of claim 13 wherein the one or more capabilities include an ability to run on the client device of the user without having an instance of a web browser running.

17. The computer system of claim 1 wherein the program code that causes the processor to make the native application available through the application store comprises program code that causes the processor to:
create a new or updated store entry for the native application based on metadata extracted from a web app manifest of the at least one PWA; and
publish the new or updated store entry to the application store.

18. The computer system of claim 1 wherein the at least one PWA is associated with a JavaScript Object Notation (JSON)-based web app manifest, and
wherein the program code that causes the processor to convert the at least one PWA into the native application comprises program code that causes the processor to translate the JSON-based web app manifest into an Extensible Markup Language (XML)-based manifest understood by the OS.

19. The computer system of claim 1 wherein the program code that causes the processor to convert the at least one PWA into the native application comprises program code that causes the processor to:
translate a JavaScript code segment corresponding to the at least one PWA's service worker into a binary format natively understood by the OS.

20. A method for automatically ingesting progressive web apps (PWAs) into an application store of an operating system (OS), the method comprising:
receiving, by a computer system from a web crawler, a list of PWAs identified via crawling one or more websites, the web crawler being configured to, for each of the one or more websites:
retrieve a web page of the website;
determine whether the web page is a PWA by checking whether the web page defines a web app manifest and a service worker, wherein the service worker is a JavaScript code segment that enables one or more client-side PWA features including push notifications, and wherein checking whether the web page defines the service worker comprises checking for an invocation of the service worker within a main JavaScript code block of the web page; and
if the web page is a PWA, add a uniform resource locator (URL) of the web page to the list of PWAs; and
for at least one PWA in the list:
converting, by the computer system, the at least one PWA into a native application that is native to the OS; and
making, by the computer system, the native application available through the application store for discovery by a user and for installation on a client device of the user.

21. A non-transitory computer readable storage medium having stored thereon program code executable by a computer system, the program code causing the computer system to:
receive, from a web crawler, a list of progressive web apps (PWAs) identified via crawling one or more websites, the web crawler being configured to, for each of the one or more websites:
retrieve a web page of the website;
determine whether the web page is a PWA by checking whether the web page defines a web app manifest and a service worker, wherein the service worker is a JavaScript code segment that enables one or more client-side PWA features including push notifications, and wherein checking whether the web page defines the service worker comprises checking for an invocation of the service worker within a main JavaScript code block of the web page; and
if the web page is a PWA, add a uniform resource locator (URL) of the web page to the list of PWAs; and
for at least one PWA in the list:
convert the at least one PWA into a native application that is native to an operating system (OS) of an application store; and
make the native application available through the application store for discovery by a user and for installation on a client device of the user.

* * * * *